US012700374B2

(12) United States Patent
Lee

(10) Patent No.: US 12,700,374 B2
(45) Date of Patent: Aug. 4, 2026

(54) DISPLAY PANEL AND DISPLAY DEVICE HAVING A NOISE CANCELLATION CIRCUIT

(71) Applicant: LG Display Co., Ltd., Seoul (KR)

(72) Inventor: Sangsoo Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/803,082

(22) Filed: Aug. 13, 2024

(65) Prior Publication Data

US 2025/0209994 A1 Jun. 26, 2025

(30) Foreign Application Priority Data

Dec. 22, 2023 (KR) ........................ 10-2023-0189216

(51) Int. Cl.
*G09G 3/3275* (2016.01)

(52) U.S. Cl.
CPC ... *G09G 3/3275* (2013.01); *G09G 2310/0297* (2013.01); *G09G 2330/06* (2013.01)

(58) Field of Classification Search
CPC .................................................... G09G 3/3275
USPC ......................................................... 345/204
See application file for complete search history.

(56) References Cited

U.S. PATENT DOCUMENTS

2019/0362666 A1* 11/2019 Chen ......................... G09G 3/20
2020/0226972 A1* 7/2020 Chen ..................... G09G 3/3677
2021/0201737 A1* 7/2021 Kang ................... G09G 3/3688

FOREIGN PATENT DOCUMENTS

KR 20200069551 A 6/2020

* cited by examiner

*Primary Examiner* — Long D Pham
(74) *Attorney, Agent, or Firm* — Seed Intellectual Property Law Goup LLP

(57) ABSTRACT

Disclosed is a display panel and a display device that reduce electromagnetic noise generated in an operation of a multiplexer of the display device. The display device includes a data driving circuit configured to supply a data signal to a display panel; a multiplexer configured to selectively supply the data signal output through one output line of the data driving circuit to at least one of a plurality of data lines of the display panel; and a noise cancellation circuit configured to generate a plurality of cancellation signals to cancel electromagnetic noise generated during an operation of the multiplexer, based on a plurality of driving signals provided to the multiplexer.

14 Claims, 5 Drawing Sheets

DISPLAY PANEL AND DISPLAY DEVICE HAVING A NOISE CANCELLATION CIRCUIT

CROSS-REFERENCE TO RELATED APPLICATION

This application claims priority from Korean Patent Application No. 10-2023-0189216 filed on Dec. 22, 2023, in the Korean Intellectual Property Office, and all the benefits accruing therefrom under 35 U.S.C. § 119, the contents of which in its entirety are herein incorporated by reference.

BACKGROUND

Technical Field

The present disclosure relates to a display panel and a display device that reduce electromagnetic noise.

Description of Related Art

As the information society develops and various portable electronic devices such as mobile communication terminals and laptop computers develop, the demand for display devices applicable thereto is gradually increasing.

The display devices include a liquid crystal display device (LCD), and an OLED display device using an organic light-emitting diode (hereinafter, OLED).

The display device includes a display panel with a plurality of gate lines and a plurality of data lines to display an image, and a data driving circuit to drive the display panel.

BRIEF SUMMARY

The data driving circuit of the display device may be composed of a plurality of data integrated circuits. Each output line of each data integrated circuit may be connected to a plurality of data lines via a multiplexer. This multiplexer may allow the number of output lines of the data driving circuit to be reduced.

However, because the multiplexer operates based on a high frequency driving signal, electromagnetic noise may be generated when the driving signal changes a state thereof. The specification is directed to technology to reduce electromagnetic noise of the driving signal of the multiplexer.

The present disclosure provides a display panel and display device that reduces electromagnetic noise generated when driving the multiplexer of the display device.

Technical features according to the present disclosure are not limited to those above-mentioned. Other technical features and characteristics according to the present disclosure that are not mentioned may be understood based on following descriptions, and may be more clearly understood based on embodiments according to the present disclosure. Further, it will be easily understood that the technical features and characteristics according to the present disclosure may be realized using means shown in descriptions herein including the claims or combinations thereof.

One embodiment of the present disclosure provides a display device comprising: a data driving circuit configured to supply a data signal to a display panel; a multiplexer configured to selectively supply the data signal output through one output line of the data driving circuit to at least one of a plurality of data lines of the display panel; and a noise cancellation circuit configured to generate a plurality of cancellation signals to cancel electromagnetic noise generated during an operation of the multiplexer, based on a plurality of driving signals provided to the multiplexer.

Another embodiment of the present disclosure provides a display panel comprising: a multiplexer; and a noise cancellation circuit configured to generate cancellation signals to cancel noise generated in a state transition of each of a first driving signal, a second driving signal, and a third driving signal applied to the multiplexer, wherein the noise cancellation circuit includes: a first logic circuit configured to perform a NOR logic operation on the first driving signal and the third driving signal to generate a first cancellation signal for cancelling noise generated in a state transition of each of the first driving signal and the third driving signal; and a second logic circuit configured to invert the second driving signal to generate a second cancellation signal for cancelling electromagnetic noise generated in a state transition of the second driving signal.

According to embodiments of the present disclosure, the electromagnetic noise generated during the state transition of the high frequency driving signal that drives the multiplexer of the display device may be cancelled. Thus, an image quality of the display device may be improved.

According to embodiments of the present disclosure, the electromagnetic noise generated due to the rising edge and the falling edge of the driving signal for operating the multiplexer may be respectively canceled with the falling edge and the rising edge of the cancellation signal.

According to embodiments of the present disclosure, poor image quality due to electromagnetic noise caused by the switching of the driving signal for operating the multiplexer, and common voltage stabilization delay may be prevented.

Effects of the present disclosure are not limited to the effects mentioned above, and other effects not mentioned will be clearly understood by those skilled in the art from the description as set forth below.

In addition to the above effects, specific effects of the present disclosure are described together while describing specific details for carrying out the present disclosure.

DETAILED DESCRIPTIONS

Figure 1:
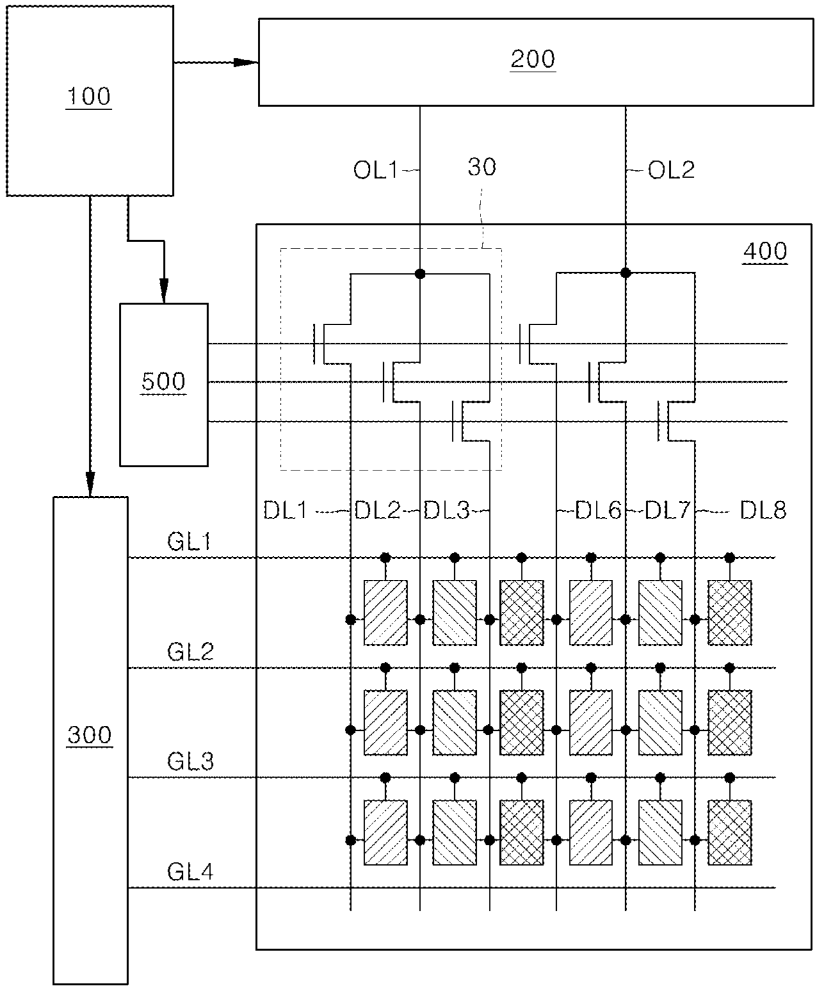
FIG. 1 is a block diagram schematically showing a display device according to an embodiment of the present disclosure.

Advantages and features of the present disclosure, and a method of achieving the advantages and features will become apparent with reference to embodiments described later in detail together with the accompanying drawings.

However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure including the appended claims.

A shape, a size, a ratio, an angle, a number, etc., disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after," "subsequent to," "before," etc., another event may occur therebetween unless "directly after," "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first," "second," "third," and so on may be used herein to describe various elements, components, regions, layers and/or periods, these elements, components, regions, layers and/or periods should not be limited by these terms. These terms are used to distinguish one element, component, region, layer or section from another element, component, region, layer or period. Thus, a first element, component, region, layer or section as described under could be termed a second element, component, region, layer or period, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects," and the like should not be construed such that any aspect or design as described is superior to or advantageous over other aspects or designs.

Further, the term "or" means "inclusive or" rather than "exclusive or." That is, unless otherwise stated or clear from the context, the expression that "x uses a or b" means any one of natural inclusive permutations.

The terms used in the description as set forth below have been selected as being general and universal in the related technical field. However, there may be other terms than the terms depending on the development and/or change of technology, convention, preference of technicians, etc. Therefore, the terms used in the description as set forth below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description as set forth below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase "immediately transferred" or "directly transferred" is used.

Throughout the present disclosure, "A and/or B" means A, B, or A and B, unless otherwise specified, and "C to D" means C inclusive to D inclusive unless otherwise specified.

"At least one" should be understood to include any combination of one or more of listed components. For example, at least one of first, second, and third components means not only a first, second, or third component, but also all combinations of two or more of the first, second, and third components.

Hereinafter, a display panel and a display device that reduce electromagnetic noise according to some embodiments will be described.

FIG. 1 is a block diagram schematically showing a display device according to an embodiment of the present disclosure.

Referring to FIG. 1, the display device according to an embodiment of the present disclosure includes a display panel 400, a multiplexer 30, a data driving circuit 200, a gate driving circuit 300, a timing controller 100, and a noise cancellation circuit 500.

The display panel 400 may be a display panel using an organic light-emitting diode element. An aera of the display panel 400 may be divided into a display area that displays an image and a non-display area other than the display area.

In the display area, a plurality of data lines DL1 to DL3 and DL6 to DL8, and a plurality of gate lines GL1 to GL4 intersect each other to define intersections. A plurality of sub-pixels are arranged in a matrix form and are respectively disposed in the intersections. A plurality of multiplexers 30 may be disposed in the non-display area of the display panel 400.

In an example in FIG. 1, it is illustrated that the plurality of multiplexers 30 are disposed in the display panel 400. However, embodiments of the present disclosure are not limited thereto, and the multiplexers may be disposed outside the display panel.

A plurality of sub-pixel areas are respectively defined as the intersections of the data lines and the gate lines. A thin-film transistor and a pixel electrode may be formed in each sub-pixel area. The thin-film transistor may supply a data signal of the data lines to the pixel electrode in response to a scan signal supplied to the gate lines.

The sub-pixels may include a plurality of red sub-pixels to emit red light, a plurality of green sub-pixels to emit green light, and a plurality of blue sub-pixels to emit blue light. Alternatively, the sub-pixels may further include white sub-pixels to improve luminance.

Each sub-pixel may include a light-emitting element and a driving circuit to drive the same. In one example, the light-emitting element may be an organic light-emitting diode element.

The timing controller 100 may generate a gate control signal and a data control signal using synchronization signals supplied from an external system. The gate control signal may include a gate start pulse, a gate shift clock, and a gate output enable signal. The data control signal may include a source start pulse, a source shift clock, and a source output enable signal.

Furthermore, the timing controller 100 may supply a plurality of driving signals for driving the multiplexer 30 to the noise cancellation circuit 500.

The noise cancellation circuit 500 may level-shift the plurality of driving signals and provide the level-shifted driving signals to the multiplexer 30.

Furthermore, the noise cancellation circuit 500 may generate a plurality of cancellation signals to cancel electromagnetic noise generated in the state transition of each of the plurality of driving signals, based on the plurality of driving signals. In this regard, the plurality of cancellation signals may be applied to cancellation signal lines disposed adjacent to driving signal lines to which the plurality of driving signals are applied. The detailed configuration of this noise cancellation circuit 500 is described in detail in descriptions of FIG. 2 and FIG. 4.

The gate driving circuit 300 may be composed of a plurality of gate integrated circuits and sequentially generates a plurality of scan pulse signals in response to the gate control signal from the timing controller 100.

The data driving circuit 200 may be composed of a plurality of data integrated circuits, and each data integrated circuit outputs a data signal corresponding to one line to output lines OL1 and OL2 for each horizontal period in response to the data control signal supplied from the timing controller 100.

For convenience of illustration, FIG. 1 shows two output lines. However, embodiments of the present disclosure are not limited thereto. A plurality of output lines may be included therein, and the plurality of data lines may be connected to each of the output lines via the multiplexer 30. FIG. 1 illustrates that one output line is connected to three data lines via the multiplexer 30. However, embodiments of the present disclosure are not limited thereto.

The multiplexer 30 time-divides the data signal output from the output line in response to the driving signal and distributes the time-divided data signals to the data lines. For example, multiplexer 30 distributes the data signal at a ratio of 1:3 in response to a first driving signal, a second driving signal, and a third driving signal.

In one example, the multiplexer 30 may include a first switch, a second switch, and a third switch. Each of the first switch, the second switch, and the third switch may be embodied as a thin-film transistor. the first switch, the second switch, and the third switch may be formed simultaneously in a formation process of elements disposed in the sub-pixel areas of the display area of the display panel 400.

In one example, the first switch of the multiplexer 30 may transmit the data signal to a first data line in response to the first driving signal. The second switch of the multiplexer 30 may transmit the data signal to a second data line in response to the second driving signal. The third switch of the multiplexer 30 may transmit the data signal to a third data line in response to the third driving signal.

In this way, the multiplexer 30 may distribute the data signal output from one output line to the three data lines, such that the number of output lines of the data driving circuit 200 may be reduced to ⅓ of the number oof the data lines.

The noise cancellation circuit 500 may receive the first driving signal, the second driving signal, and the third driving signal from the timing controller 100, and may level-shift the first driving signal, the second driving signal, and the third driving signal and may provide to the level-shifted first driving signal, the level-shifted second driving signal, and the level-shifted third driving signal respectively to the first switch, the second switch, and the third switch of the multiplexer 30.

Furthermore, the noise cancellation circuit 500 may generate a first cancellation signal and a second cancellation signal based on the first driving signal, the second driving signal, and the third driving signal, and may level-shift the first cancellation signal and the second cancellation signal and may apply the level-shifted first cancellation signal and the level-shifted second cancellation signal respectively to the cancellation signal lines.

Figure 2:
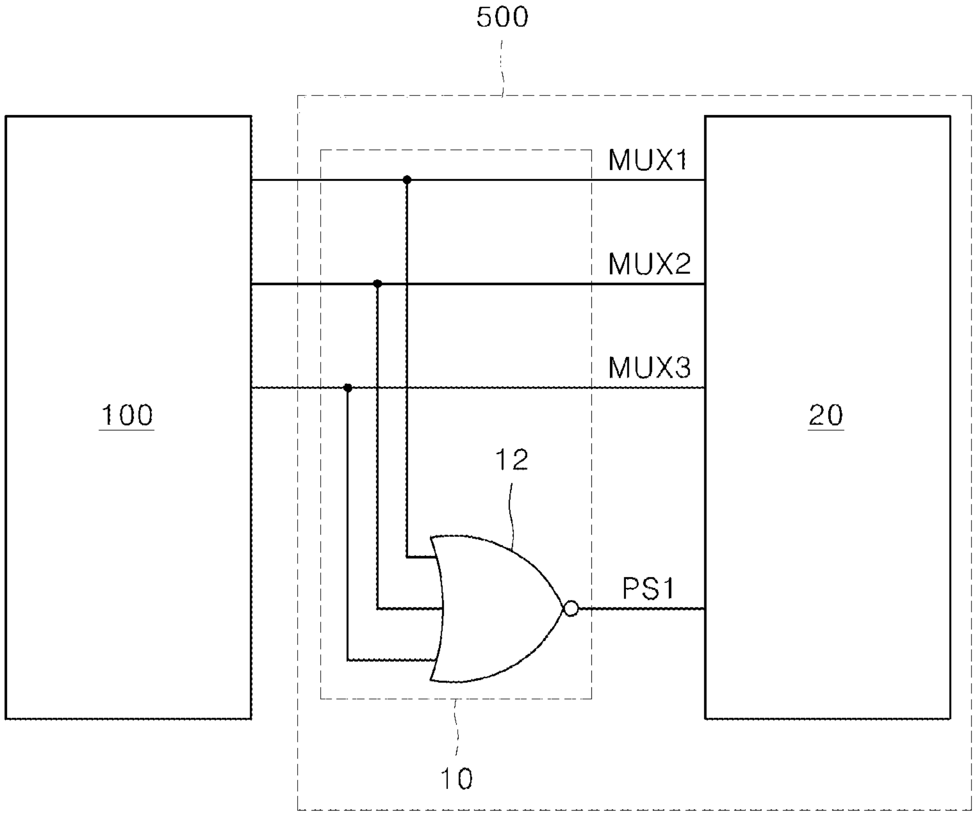
FIG. 2 shows an electromagnetic noise cancellation circuit according to a first embodiment of the present disclosure.

FIG. 2 shows an electromagnetic noise cancellation circuit according to a first embodiment of the present disclosure.

The timing controller 100 provides a first driving signal MUX1, a second driving signal MUX2, and a third driving signal MUX3 to control the operation of the multiplexer 30 to the noise cancellation circuit 500.

The noise cancellation circuit 500 may include a logic circuit 10 and a level-shifter 20.

The logic circuit 10 may perform a NOR logic operation on the first driving signal MUX1, the second driving signal MUX2, and the third driving signal MUX3 to generate a cancellation signal PS1. The level-shifter 20 may level-shift the first driving signal MUX1, the second driving signal MUX2, and the third driving signal MUX3 and provide the level-shifted first driving signal MUX1, second driving signal MUX2, and third driving signal MUX3 respectively to the first switch, the second switch, and the third switch of the multiplexer 30.

Furthermore, the level-shifter 20 may level-shift the cancellation signal PS1 and provide the level-shifted cancellation signal PS1 to the cancellation signal line. The cancellation signal line may be disposed adjacent to the driving signal lines to which the first driving signal MUX1, the second driving signal MUX2, and the third driving signal MUX3 are applied, respectively.

Figure 3:
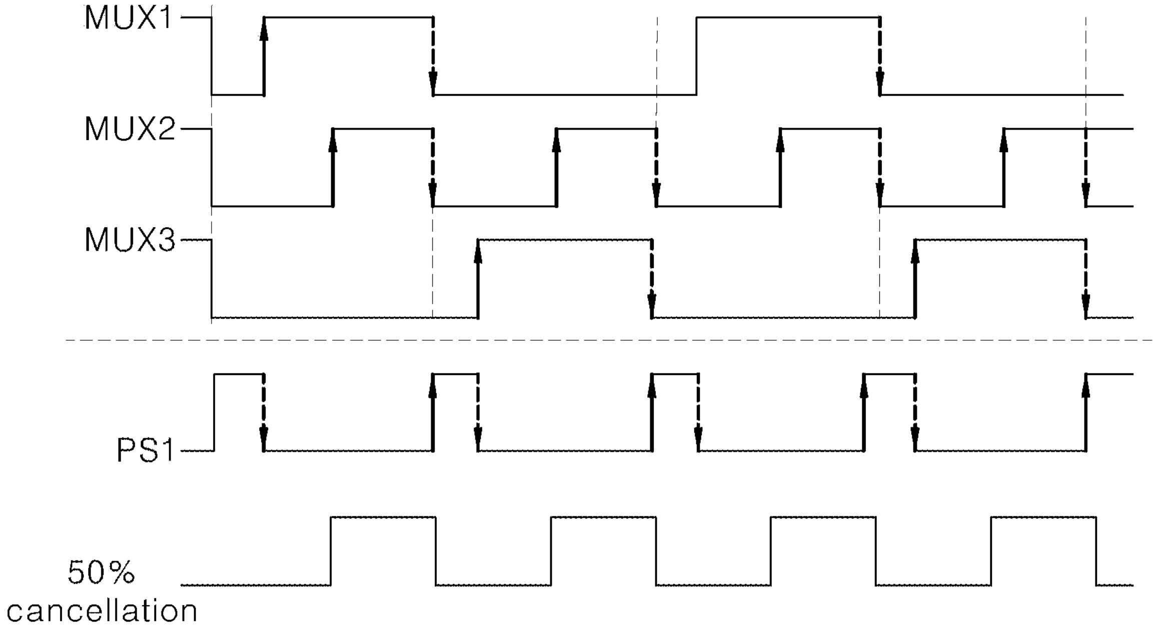
FIG. 3 is a signal waveform diagram related to an electromagnetic noise cancellation circuit according to the first embodiment of the present disclosure.

FIG. 3 is a signal waveform diagram related to the electromagnetic noise cancellation circuit according to the first embodiment of the present disclosure.

Referring to FIG. 2 and FIG. 3, the noise cancellation circuit 500 performs the NOR logic operation on the first driving signal MUX1, the second driving signal MUX2, and the third driving signal MUX3 to generate the first cancellation signal PS1 to cancel electromagnetic noise generated in the state transition of each of the first driving signal MUX1, the second driving signal MUX2, the third driving signal MUX3.

In this regard, the first cancellation signal PS1 has a waveform that transitions from a high level to a low level when the first driving signal MUX1 transitions from a low level to a high level. Thus, the electromagnetic noise generated when the first driving signal MUX1 transitions from a low level to a high level may be canceled.

Furthermore, the first cancellation signal PS1 has a waveform that transitions from a low level to a high level when the first driving signal MUX1 transitions from a high level to a low level. Thus, electromagnetic noise generated when the first driving signal MUX1 transitions from a high level to a low level may be canceled.

Furthermore, the first cancellation signal PS1 has a waveform that transitions from a high level to a low level when the third driving signal MUX3 transitions from a low level to a high level. Thus, electromagnetic noise generated when the third driving signal MUX3 transitions from a low level to a high level may be canceled.

Furthermore, the first cancellation signal PS1 has a waveform that transitions from a low level to a high level when the third driving signal MUX1 transitions from a high level to a low level. Thus, electromagnetic noise generated when the third driving signal MUX3 transitions from a high level to a low level may be canceled.

However, as shown in FIG. 3, the first cancellation signal PS1 does not transition but is maintained at a low level when the second driving signal MUX2 transitions from a low level to a high level. Accordingly, the first cancellation signal PS1 cannot cancel the noise generated when the second driving signal MUX2 transitions from a low level to a high level.

This noise may have a negative effect on EMI. To remove this situation, the present disclosure provides an electromagnetic noise cancellation circuit that may cancel 100% of the noise generated during the state transition of each of all driving signals of the multiplexer 30.

Figure 4:
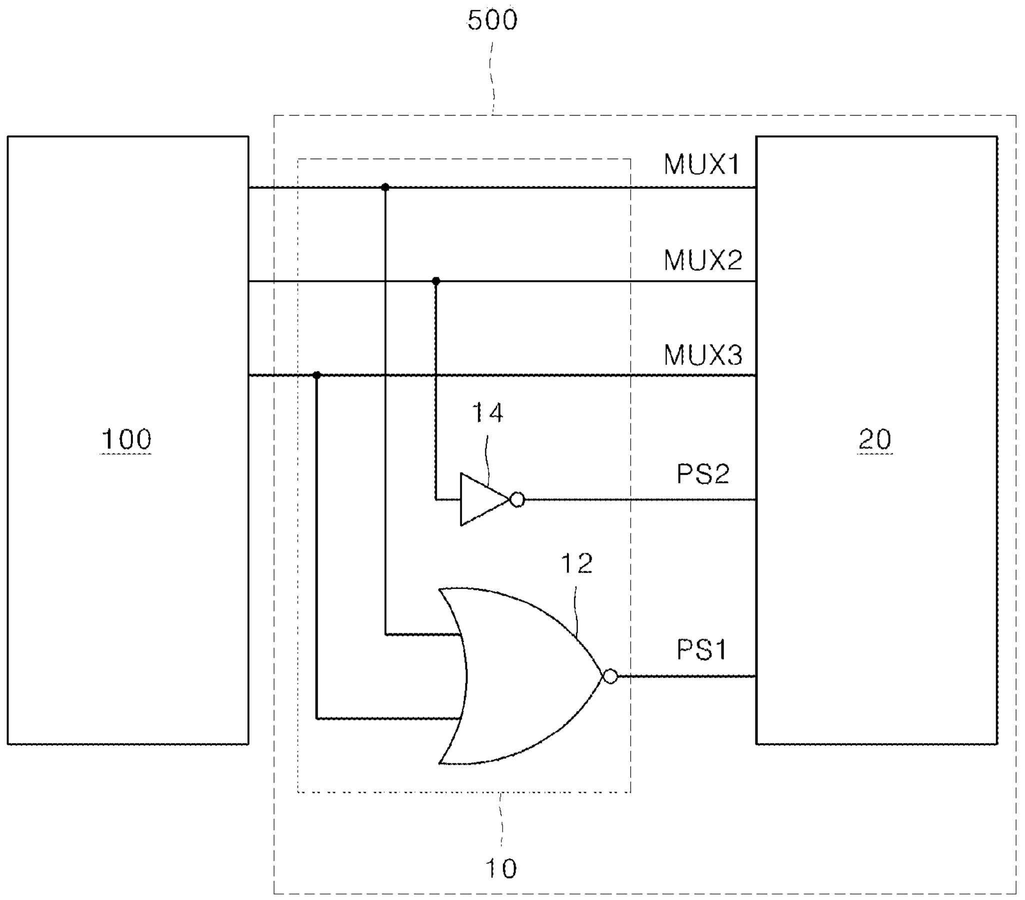
FIG. 4 shows an electromagnetic noise cancellation circuit according to a second embodiment of the present disclosure.

FIG. 4 shows an electromagnetic noise cancellation circuit according to a second embodiment of the present disclosure.

Referring to FIG. 4, the noise cancellation circuit 500 may include the logic circuit 10 including a first logic circuit 12 and a second logic circuit 14, and the level-shifter 20.

The timing controller 100 provides the first driving signal MUX1, the second driving signal MUX2, and the third driving signal MUX3 to control the operation of the multiplexer 30 to the noise cancellation circuit 500.

The first logic circuit 12 may perform a NOR logic operation on the first driving signal MUX1 and the third driving signal MUX3 to generate the first cancellation signal PS1. The first cancellation signal PS1 has a waveform that transitions from a low level to a high level when each of the first driving signal MUX1 and the third driving signal MUX3 transitions from a high level to a low level. Furthermore, the first cancellation signal PS1 has a waveform that transitions from a high level to a low level when each of the first driving signal MUX1 and the third driving signal MUX3 transitions from a low level to a high level. In one example, the first logic circuit 12 may be a NOR logic element.

The second logic circuit 14 may invert the second driving signal MUX2 to generate a second cancellation signal PS2. The second cancellation signal PS2 has a waveform having a phase opposite to a phase of the second driving signal MUX2. In one example, the second logic circuit 14 may be an inverter element.

The level-shifter 20 may level-shift the first driving signal MUX1, the second driving signal MUX2, and the third driving signal MUX3 and provide the level-shifted first driving signal MUX1, second driving signal MUX2, and third driving signal MUX3 respectively to the first switch, the second switch, and the third switch of the multiplexer 30.

Furthermore, the level-shifter 20 may level-shift the first cancellation signal PS1 and the second cancellation signal PS2 and provide the level-shifted first cancellation signal PS1 and second cancellation signal PS2 respectively to the first cancellation signal line and the second cancellation signal line. In one example, the first cancellation signal line and the second cancellation signal line may be disposed adjacent to the driving signal lines to which the first driving signal MUX1, the second driving signal MUX2, and the third driving signal MUX3 are applied, respectively.

Figure 5:
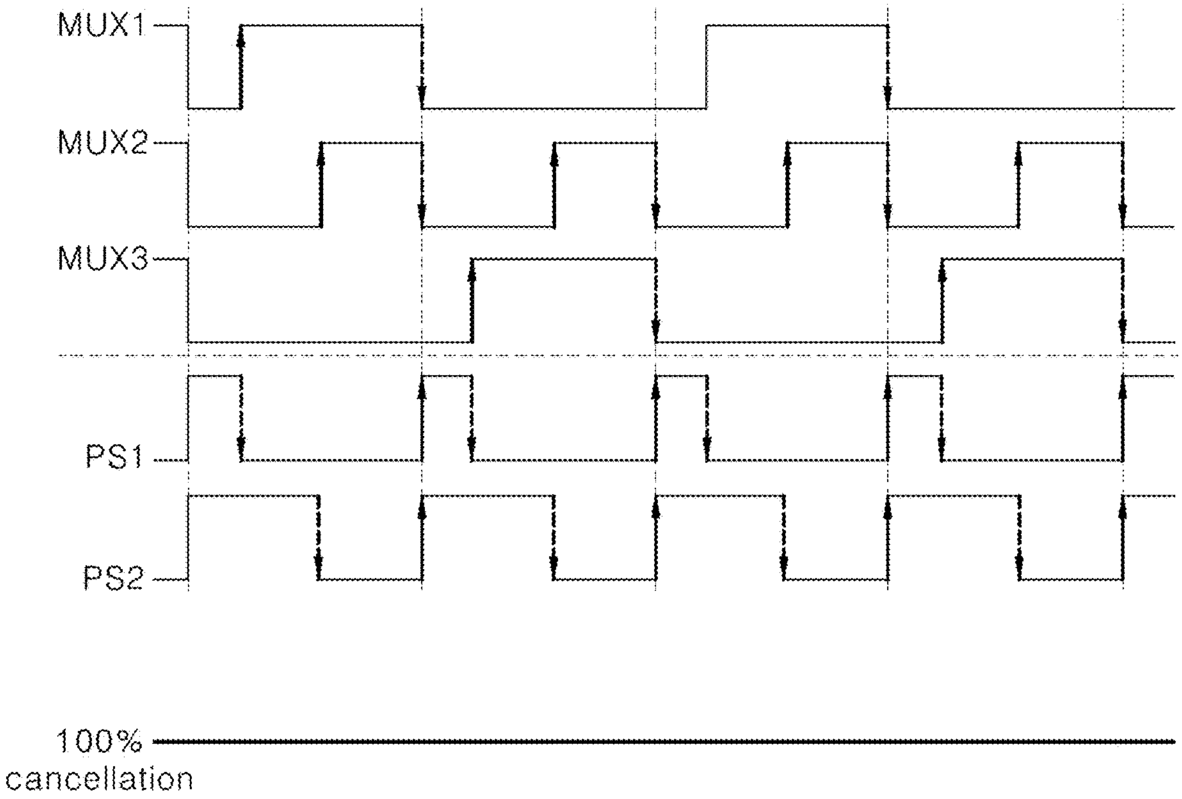
FIG. 5 is a signal waveform diagram related to the electromagnetic noise cancellation circuit according to the second embodiment of the present disclosure.

FIG. 5 is a signal waveform diagram related to the electromagnetic noise cancellation circuit according to the second embodiment of the present disclosure.

Referring to FIG. 4 and FIG. 5, the noise cancellation circuit 500 performs the NOR logic operation on the first driving signal MUX1 and the third driving signal MUX3 to generate the first cancellation signal PS1 to cancel electromagnetic noise generated when the state transition of each of the first driving signal MUX1 and the third driving signal MUX3.

In this regard, the first cancellation signal PS1 has a waveform that transitions from a high level to a low level when the first driving signal MUX1 transitions from a low level to a high level. Furthermore, the first cancellation signal PS1 has a waveform that transitions from a low level to a high level when the first driving signal MUX1 transitions from a high level to a low level. Furthermore, the first cancellation signal PS1 has a waveform that transitions from a high level to a low level when the third driving signal MUX3 transitions from a low level to a high level. Furthermore, the first cancellation signal PS1 has a waveform that transitions from a low level to a high level when the third driving signal MUX1 transitions from a high level to a low level.

Thus, the first cancellation signal PS1 may cancel the electromagnetic noise generated when the first driving signal MUX1 transitions from a low level to a high level or from a high level to a low level. Furthermore, the first cancellation signal PS1 may cancel the electromagnetic noise generated when the third driving signal MUX3 transitions from a low level to a high level or from a high level to a low level.

Furthermore, the noise cancellation circuit 500 inverts the second driving signal MUX2 to generate the second cancellation signal PS2 to cancel the electromagnetic noise generated when the second driving signal MUX2 transitions.

In this regard, the second cancellation signal PS2 has a waveform that transitions from a high level to a low level when the second driving signal MUX2 transitions from a low level to a high level. Furthermore, the second cancellation signal PS2 has a waveform that transitions from a low level to a high level when the second driving signal MUX2 transitions from a high level to a low level.

Thus, the second cancellation signal PS2 may cancel electromagnetic noise generated when the second driving signal MUX2 transitions from a low level to a high level or from a high level to a low level.

Figure 6:
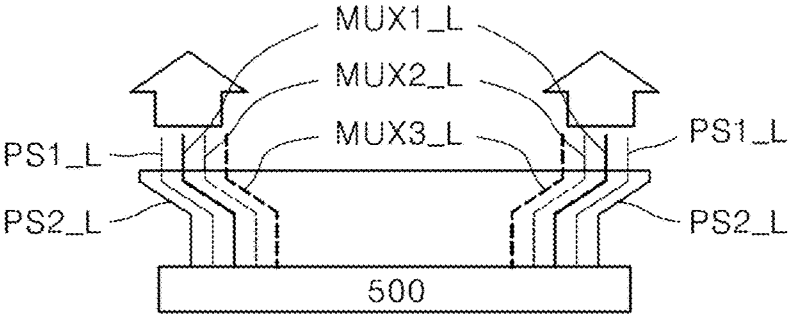
FIG. 6 is a layout diagram of a driving signal line and a cancellation signal line of the display device according to an embodiment of the present disclosure.

FIG. 6 is a layout diagram of the driving signal line and the cancellation signal line of the display device according to an embodiment of the present disclosure.

Referring to FIG. 6, the noise cancellation circuit 500 level-shifts the first driving signal MUX1, the second driving signal MUX2, and the third driving signal MUX3 and provides the level-shifted first driving signal MUX1, second driving signal MUX2, and third driving signal MUX3 respectively to a first driving signal line MUX1_L, a second driving signal line MUX2_L, and a third driving signal line MUX3_L.

The first driving signal line MUX1_L, the second driving signal line MUX2_L, and the third driving signal line MUX3_L may be connected to the first switch, the second switch, and the third switch of the multiplexer 30 of the display panel 400, respectively. In one example, each of the first switch, the second switch, and the third switch may be embodied as a thin-film transistor. Each of the first driving signal line MUX1_L, the second driving signal line MUX2_L, and the third driving signal line MUX3_L may be connected to a gate electrode of a corresponding thin-film transistor.

Furthermore, the noise cancellation circuit 500 level-shifts the first cancellation signal PS1 and the second cancellation signal PS2 and provides the level-shifted first cancellation signal PS1 and second cancellation signal PS2 to a first cancellation signal line PS1_L and a second cancellation signal line PS2_L, respectively.

The first cancellation signal line PS1_L and the second cancellation signal line PS2_L may be disposed adjacent to the first driving signal line MUX1_L, the second driving signal line MUX2_L, and the third driving signal line MUX3_L.

Furthermore, at least one of the first cancellation signal line PS1_L and the second cancellation signal line PS2_L may be disposed adjacent to the first driving signal line MUX1_L, the second driving signal line MUX2_L, and the third driving signal line MUX3_L and may have a closed loop form.

In one example, the first cancellation signal line PS1_L may be disposed adjacent to the first driving signal line MUX1_L, the second driving signal line MUX2_L, and the third driving signal line MUX3_L. The second cancellation signal line PS2_L may have a partial section adjacent to the first cancellation signal line PS1_L, the first driving signal line MUX1_L, the second driving signal line MUX2_L, and the third driving signal line MUX3_L and may have a closed loop form.

In another embodiment, the noise cancellation circuit 500 may be mounted on a plurality of data integrated circuits within the data driving circuit 200. Each data integrated circuit may provide the first driving signal MUX1, the second driving signal MUX2, and the third driving signal MUX3 from each of both opposing sides thereof to the multiplexer 30 of the display panel 400.

Furthermore, each data integrated circuit may generate the first cancellation signal PS1 and the second cancellation signal PS2 and may provide the first cancellation signal PS1 and the second cancellation signal PS2 respectively to the first cancellation signal line PS1_L and the second cancellation signal line PS2_L adjacent to the first driving signal line MUX1_L, the second driving signal line MUX2_L, and the third driving signal line MUX3_L, wherein the second cancellation signal line PS2_L is adjacent to the first cancellation signal line PS1_L.

A display device and a display panel according to some aspects and embodiments of the present disclosure may be described as follows:

One aspect of the present disclosure provides a display device comprising: a data driving circuit configured to supply a data signal to a display panel; a multiplexer configured to selectively supply the data signal output through one output line of the data driving circuit to at least one of a plurality of data lines of the display panel; and a noise cancellation circuit configured to generate a plurality of cancellation signals to cancel electromagnetic noise generated during an operation of the multiplexer, based on a plurality of driving signals provided to the multiplexer.

In accordance with some embodiments of the display device of the present disclosure, the plurality of driving signals include a first driving signal, a second driving signal, and a third driving signal, wherein the noise cancellation circuit is configured to receive the plurality of driving signals from the timing controller, to level-shift the plurality of driving signals, and to provide the plurality of level-shifted driving signals to the multiplexer.

In accordance with some embodiments of the display device of the present disclosure, the multiplexer includes: a first switch configured to transmit the data signal to a first data line among the plurality of data lines in response to the first driving signal; a second switch configured to transmit the data signal to a second data line among the plurality of data lines in response to the second driving signal; and a third switch configured to transmit the data signal to a third data line among the plurality of data lines in response to the third driving signal.

In accordance with some embodiments of the display device of the present disclosure, the noise cancellation circuit includes a first logic circuit configured to perform a NOR logic operation on the first driving signal and the third driving signal to generate a first cancellation signal for canceling noise generated in a state transition of each of the first driving signal and the third driving signal.

In accordance with some embodiments of the display device of the present disclosure, the noise cancellation circuit further includes a second logic circuit configured to invert the second driving signal to generate a second cancellation signal for cancelling electromagnetic noise generated in a state transition of the second driving signal.

In accordance with some embodiments of the display device of the present disclosure, the noise cancellation circuit further includes a level-shifter configured to level-shift each of the first driving signal, the second driving signal, the third driving signal, the first cancellation signal and the second cancellation signal.

In accordance with some embodiments of the display device of the present disclosure, the display device further comprises: a plurality of driving signal lines disposed between the noise cancellation circuit and the multiplexer, wherein the plurality of driving signals are respectively applied to the plurality of driving signal lines; and a plurality of cancellation signal lines disposed adjacent to the plurality of driving signal lines, wherein the plurality of cancellation signals are respectively applied to the plurality of cancellation signal lines.

In accordance with some embodiments of the display device of the present disclosure, the plurality of driving signals include a first driving signal, a second driving signal, and a third driving signal, wherein the plurality of cancellation signal lines include a first cancellation signal line and a second cancellation signal line, wherein the first cancellation signal line and the second cancellation signal line are disposed adjacent to the first driving signal line, the second driving signal line, and the third driving signal line.

In accordance with some embodiments of the display device of the present disclosure, at least one of the first cancellation signal line and the second cancellation signal line is adjacent to at least one of the first driving signal line, the second driving signal line, and the third driving signal line and has a loop form.

Another aspect of the present disclosure provides a display panel comprising: a multiplexer; and a noise cancellation circuit configured to generate cancellation signals to cancel noise generated in a state transition of each of a first driving signal, a second driving signal, and a third driving signal applied to the multiplexer, wherein the noise cancellation circuit includes: a first logic circuit configured to perform a NOR logic operation on the first driving signal and the third driving signal to generate a first cancellation signal for cancelling noise generated in a state transition of each of the first driving signal and the third driving signal; and a second logic circuit configured to invert the second driving signal to generate a second cancellation signal for cancelling electromagnetic noise generated in a state transition of the second driving signal.

In accordance with some embodiments of the display panel of the present disclosure, the display panel further comprises a level-shifter configured to level-shift each of the first cancellation signal and the second cancellation signal.

In accordance with some embodiments of the display panel of the present disclosure, the display panel further comprises a data driving circuit configured to supply a data signal to the multiplexer, wherein the noise cancellation circuit is disposed within the data driving circuit.

In accordance with some embodiments of the display panel of the present disclosure, the first cancellation signal has a waveform constructed such that: the first cancellation signal transitions from a high level to a low level when at least one of the first driving signal and the third driving signal transitions from a low level to a high level; and the first cancellation signal transitions from a low level to a high level when the at least one of the first driving signal and the third driving signal transitions from a high level to a low level.

In accordance with some embodiments of the display panel of the present disclosure, the second cancellation signal has a waveform constructed such that: the second cancellation signal transitions from a high level to a low level when the second driving signal transitions from a low level to a high level; and the second cancellation signal transitions from a low level to a high level when the second driving signal transitions from a high level to a low level.

According to embodiments of the present disclosure, the electromagnetic noise generated during the state transition of the high frequency driving signal that drives the multiplexer of the display device may be cancelled. Thus, an image quality of the display device may be improved.

According to embodiments of the present disclosure, the electromagnetic noise generated due to the rising edge and the falling edge of the driving signal for operating the multiplexer may be respectively canceled with the falling edge and the rising edge of the cancellation signal.

According to embodiments of the present disclosure, poor image quality due to electromagnetic noise caused by the switching of the driving signal for operating the multiplexer, and common voltage stabilization delay may be prevented.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a data driving circuit configured to supply a data signal for a display panel;

a multiplexer configured to selectively supply the data signal output through one output line of the data driving circuit to at least one of a plurality of data lines of the display panel;

a noise cancellation circuit configured to generate a plurality of cancellation signals based on a plurality of driving signals provided to the multiplexer;

a plurality of driving signal lines disposed between the noise cancellation circuit and the multiplexer, wherein the plurality of driving signals are configured to be respectively applied to the plurality of driving signal lines; and a plurality of cancellation signal lines disposed adjacent to the plurality of driving signal lines, wherein the plurality of cancellation signals are configured to be respectively applied to the plurality of cancellation signal lines.

2. The display device of claim 1, further comprising a timing controller, wherein the plurality of driving signals include a first driving signal, a second driving signal, and a third driving signal, wherein the noise cancellation circuit is configured to receive the plurality of driving signals from the timing controller, to level-shift the plurality of driving signals, and to provide the plurality of level-shifted driving signals to the multiplexer.

3. The display device of claim 2, wherein the multiplexer includes:

a first switch configured to transmit the data signal to a first data line among the plurality of data lines in response to the first driving signal;

a second switch configured to transmit the data signal to a second data line among the plurality of data lines in response to the second driving signal; and a third switch configured to transmit the data signal to a third data line among the plurality of data lines in response to the third driving signal.

4. The display device of claim 3, wherein the noise cancellation circuit includes a first logic circuit configured to perform a NOR logic operation on the first driving signal and the third driving signal to generate a first cancellation signal for canceling noise generated in a state transition of each of the first driving signal and the third driving signal.

5. The display device of claim 4, wherein the noise cancellation circuit further includes a second logic circuit configured to invert the second driving signal to generate a second cancellation signal.

6. The display device of claim 5, wherein the noise cancellation circuit further includes a level-shifter configured to level-shift each of the first driving signal, the second driving signal, the third driving signal, the first cancellation signal and the second cancellation signal.

7. The display device of claim 1, wherein the plurality of driving signals include a first driving signal, a second driving signal, and a third driving signal, wherein the plurality of cancellation signal lines include a first cancellation signal line and a second cancellation signal line, wherein the first cancellation signal line and the second cancellation signal line are disposed adjacent to the first driving signal line, the second driving signal line, and the third driving signal line.

8. The display device of claim 7, wherein at least one of the first cancellation signal line and the second cancellation signal line is adjacent to at least one of the first driving signal line, the second driving signal line, and the third driving signal line and has a loop form.

9. A display panel, comprising:

a multiplexer; and a noise cancellation circuit configured to generate cancellation signals to cancel noise generated in a state transition of each of a first driving signal, a second driving signal, and a third driving signal applied to the multiplexer, wherein the noise cancellation circuit includes:

a first logic circuit configured to perform a NOR logic operation on the first driving signal and the third driving signal to generate a first cancellation signal; and a second logic circuit configured to invert the second driving signal to generate a second cancellation signal.

10. The display panel of claim 9, further comprising a level-shifter configured to level-shift each of the first cancellation signal and the second cancellation signal.

11. The display panel of claim 9, further comprising a data driving circuit configured to supply a data signal to the multiplexer, wherein the noise cancellation circuit is disposed within the data driving circuit.

12. The display panel of claim 9, wherein the first cancellation signal has a waveform constructed such that:

the first cancellation signal transitions from a high level to a low level when at least one of the first driving signal and the third driving signal transitions from a low level to a high level; and the first cancellation signal transitions from a low level to a high level when the at least one of the first driving signal and the third driving signal transitions from a high level to a low level.

13. The display panel of claim 9, wherein the second cancellation signal has a waveform constructed such that:

the second cancellation signal transitions from a high level to a low level when the second driving signal transitions from a low level to a high level; and the second cancellation signal transitions from a low level to a high level when the second driving signal transitions from a high level to a low level.

14. A display device, comprising:

a data driving circuit configured to supply a data signal;

a multiplexer configured to selectively supply the data signal output through one output line of the data driving circuit to one of two data lines of the display panel;

a timing controller configured to apply a first driving signal and a second driving signal to the multiplexer;

a noise cancellation circuit configured to generate a cancellation signal based on the first driving signal and the second driving signal;

a first driving signal line and a second driving signal line disposed between the noise cancellation circuit and the multiplexer, wherein the first driving signal is configured to be applied to the first driving signal line, and the second driving signal is configured to be applied to the second driving signal line; and a cancellation signal line disposed adjacent to the first driving signal line and the second driving signal line, wherein the cancellation signal is configured to be applied to the cancellation signal line.

* * * * *